US010957017B1

(12) United States Patent
Minor (10) Patent No.: US 10,957,017 B1
(45) Date of Patent: Mar. 23, 2021

(54) SYNTHETIC IMAGE DETECTOR (71) Applicant: SHUTTERSTOCK, INC., New York, NY (US)

(72) Inventor: Bryan Michael Minor, New York, NY (US)

(73) Assignee: Shutterstock, Inc., New York, NY (US)

( * ) Notice: Subject to any disclaimer, the term of this patent is extended or adjusted under 35 U.S.C. 154(b) by 80 days.

(21) Appl. No.: 16/385,462

(22) Filed: Apr. 16, 2019

(51) Int. Cl.
*G06T 3/40* (2006.01)
*G06T 5/00* (2006.01)
*G06T 1/60* (2006.01)

(52) U.S. Cl.
CPC .............. *G06T 3/4076* (2013.01); *G06T 1/60* (2013.01); *G06T 5/001* (2013.01); *G06T 2207/20081* (2013.01)

(58) Field of Classification Search
CPC ................................. G06T 3/4076; G06T 1/60
See application file for complete search history.

(56) References Cited

U.S. PATENT DOCUMENTS 6,763,149 B2 * 7/2004 Riley ....................... G01J 3/28
382/218
8,161,511 B2 * 4/2012 Kwak .................. H04N 21/235
725/62

* cited by examiner

*Primary Examiner* — Tuan H Nguyen
(74) *Attorney, Agent, or Firm* — McDermott Will & Emery LLP (57) ABSTRACT

A method including receiving a first image file in a network server is provided. The method also includes selecting multiple criteria in a test ensemble for the first image file and evaluating a synthetic value for the first image file according to the test ensemble. The method includes storing the first image file and the synthetic value for the first image file in a database, and providing for display the first image file and the synthetic value for the first image file in response to a search query from a user. A system and a non-transitory, computer-readable medium storing instructions to perform the above method are also provided.

14 Claims, 8 Drawing Sheets

SYNTHETIC IMAGE DETECTOR

BACKGROUND

Field

The present disclosure generally relates to automatic detection of synthetic multimedia files. More specifically, the present disclosure relates to automatic detection and assessment of synthetic image files uploaded to an image database.

Description of the Related Art

Current image processing devices and systems have developed a rich capacity to elaborate synthetic images from a variety of sources. In some cases, the end result of such devices and systems may be indistinguishable from an apparent real source, to the human eye. This poses the problem of serious liabilities for graphic designers, news organizations, and other media outlets for whom content authenticity may be a core business proposition. The high development of artificial intelligence and deep learning algorithms has only exacerbated the problem.

SUMMARY

In one embodiment of the present disclosure, a computer-implemented method is described that includes receiving a first image file in a network server and selecting multiple criteria in a test ensemble for the first image file. The computer-implemented method also includes evaluating a synthetic value for the first image file according to the test ensemble, storing the first image file and the synthetic value for the first image file in a database, and providing for display the first image file and the synthetic value for the first image file in response to a search query from a user.

In one embodiment of the present disclosure, a computer-implemented method is described that includes selecting multiple images in a training set according to multiple discriminative criteria, each image having a known synthetic value. The computer-implemented method includes forming a test ensemble including multiple discriminative tools, each discriminative tool associated with a weighting factor and evaluating a test synthetic value for an image in the training set using the test ensemble. The computer-implemented method also includes automatically modifying the weighting factor for at least one discriminative tool in the test ensemble based on a back-propagation of the known synthetic value, and configuring the test ensemble in a synthetic image detector engine communicatively coupled to a network.

According to one embodiment, a system is described that includes one or more processors and a memory coupled to the one or more processors, the memory including instructions that, when executed by the one or more processors, cause the one or more processors to receive a first image file, and to select multiple criteria in a test ensemble for the first image file. The one or more processors also execute instructions to evaluate a synthetic value for the first image file according to the test ensemble, to store the first image file and the synthetic value for the first image file in a database; and to provide for display the first image file and the synthetic value for the first image file in response to a search query from a user.

According to one embodiment, a non-transitory, machine-readable medium is described that includes instructions, which when executed by one or more processors, cause a computer to perform a method including receiving a first image file in a network server. The method also includes selecting multiple criteria in a test ensemble for the first image file and evaluating a synthetic value for the first image file according to the test ensemble. The method also includes storing the first image file and the synthetic value for the first image file in a database and providing for display the first image file and the synthetic value for the first image file in response to a search query from a user.

In yet other embodiment, a system is described that includes a means for storing commands and a means for executing the commands causing the system to perform a method that includes receiving a first image file in a network server. The method also includes selecting multiple criteria in a test ensemble for the first image file and evaluating a synthetic value for the first image file according to the test ensemble. The method also includes storing the first image file and the synthetic value for the first image file in a database and providing for display the first image file and the synthetic value for the first image file in response to a search query from a user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a search query associated with an image for identifying the image.

The present disclosure relates to techniques and methods for identifying a synthetic image, or adding a synthetic score to an image, to more accurately assess resources in an image database. High resolution image generation using a Generative Adversarial Network (GAN) methodology results in the development of two deep learning models: a generative tool and a discriminative tool. Embodiments as disclosed herein use the discriminative tool for identification of synthetic images, or synthetic components in an image. In some embodiments, the skills learned by the discriminative tool during the GAN training process are leveraged to provide a highly skilled fake/synthetic image detector.

Some implementations provide a front-end portal that users can access remotely using a mobile device or a workstation. In the front-end portal, the user may request for any given input image to be analyzed and to determine a synthetic score for the image.

Embodiments as disclosed herein provide a solution to the problem arising in the realm of computer technology of misleading identity of image resources in an image search engine. To address the above problem, embodiments as disclosed herein combine multiple discriminative tools developed for producing high quality synthetic imagery by GAN technologies. It is expected that synthetic images generated through multiple GAN applications may soon be commonplace in image databases. In a GAN model, the quality of the generative tool is rivalled by the quality of the discriminative tool, thus driving in tandem the evolution of the GAN model. Embodiments as disclosed herein use discriminative tools from GAN models to detect synthetic imagery with calibration of its efficacy.

The proposed solution further provides improvements to the functioning of the computer itself because it eliminates the need for deep and exhaustive analysis of a given image to determine whether it comes from a legitimate source or not. Algorithms as disclosed herein are trained over massive training sets of images and therefore provide answers to the true or synthetic nature of an image quickly and with a high degree of certainty.

Currently, detection of synthetic imagery is based on computer vision machine learning techniques involving significant feature engineering and validation. Embodiments as disclosed herein reduce significantly the use of computational resources because discriminative tools as disclosed herein do not rely on feature engineering. Accordingly, in embodiments as disclosed herein, the unsupervised learning of the GAN model automatically creates a discriminative tool that can efficiently assess a synthetic score of an image. The discriminative tool learns automatically how to detect synthetic imaginary through the examination of millions of images during the development of the GAN model. Further, some embodiments include multiple discriminative tools developed in as many GAN models, which shows promise for dealing with more general cases of synthetic imaging.

Accordingly, some embodiments may further include multiple discriminative tools developed in as many types of GAN models. The use of multiple discriminative tools, either alone or as an ensemble, provides a highly flexible methodology for detecting synthetic images. Some embodiments include tuning the detection process to identification of many distinct sources of synthetic images with a properly selected and calibrated set of discriminative tools.

Embodiments as disclosed herein include applications where the legitimacy of images is a basic premise. This includes imagery for marketing, medical diagnosis, news articles and media in general, art galleries and sporting events, among others. This technology also applies to videos, allowing the identification of synthetic images within the video.

Example System Architecture

Figure 1:
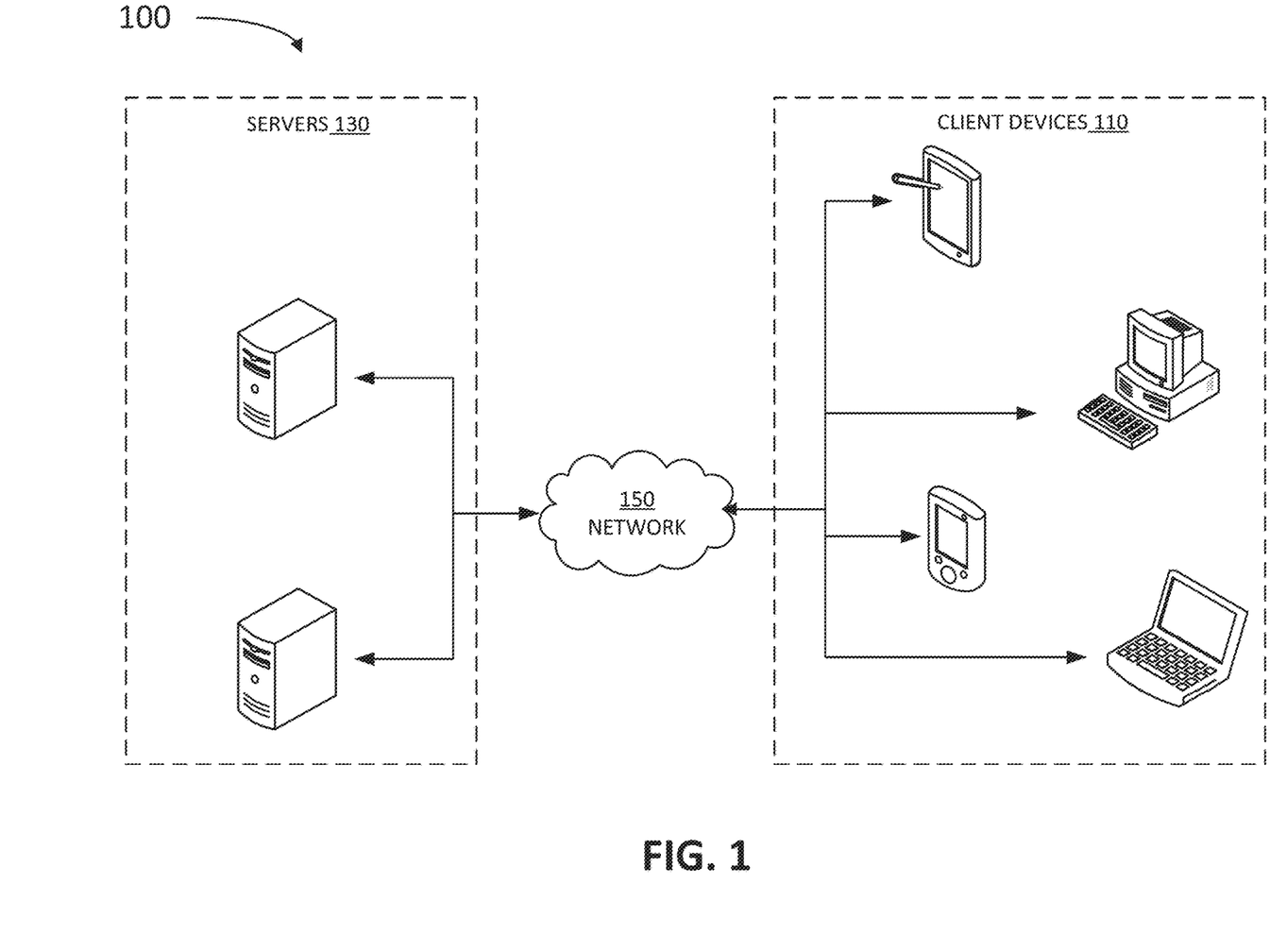
FIG. 1 illustrates an example architecture suitable for detecting synthetic images, according to some embodiments.

FIG. 1 illustrates an example architecture 100 for an image search engine suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to identify whether an image provided by the user of one of client devices 110 is synthetic or real. In some embodiments, the processor is configured to identify whether an image to be downloaded by a user of one of client devices 110 from one of servers 130 is synthetic or real. The processor may use a suitably trained generative tool to merge the component images into the synthetic image, and a discriminative tool to evaluate a synthetic detectability of the synthetic image (e.g., the resemblance of the synthetic image with a real image from the image database). For purposes of load balancing, multiple servers 130 can host memories including instructions to one or more processors, and multiple servers 130 can host a history log and the second image database.

Servers 130 may include any device having an appropriate processor, memory, and communications capability for hosting the generative tool, the discriminative tool, and a generative adversarial network (GAN) engine hosting the tools. The GAN engine may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
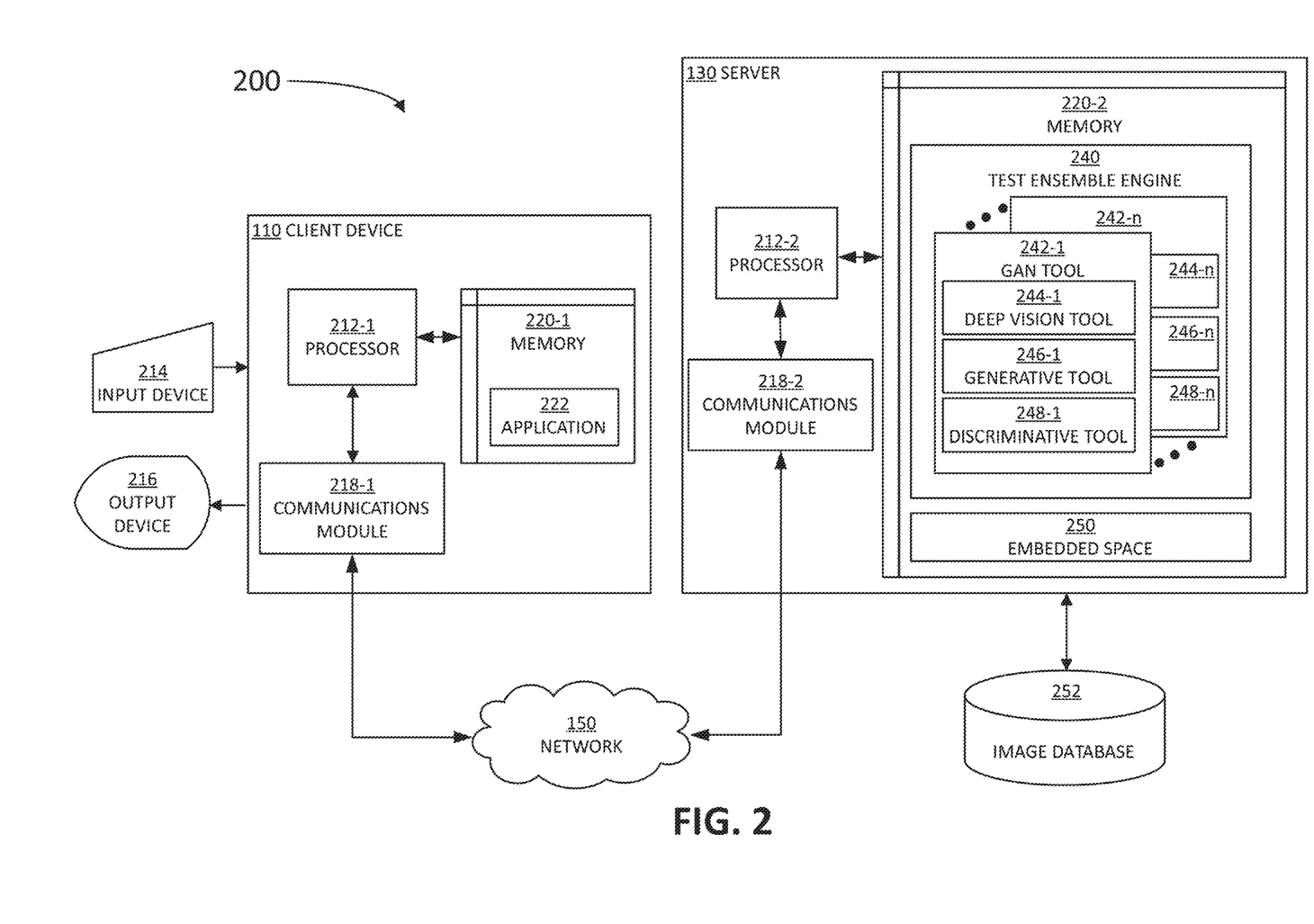
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like.

Server 130 includes a memory 220-2, a processor 212-2, and communications module 218-2. Processor 212-2 is configured to execute instructions, such as instructions physically coded into processor 212-2, instructions received from software in memory 220-2, or a combination of both. In some embodiments, memory 220-2 includes a test ensemble engine 240. Test ensemble engine 240 may include multiple GAN tools 242-1 through 242-n (where 'n' may be any integer), collectively referred to, hereinafter, as "GAN tools 242." GAN tools 242 may include deep vision tools 244-1 through 244-n (hereinafter, collectively referred to as "deep vision tools 244") respectively, generative tools 246-1 through 246-n (hereinafter, collectively referred to as "generative tools 246") respectively, and discriminative tools 248-1 through 248-n (hereinafter, collectively referred to as "discriminative tools 248") respectively. Deep vision tool 244 is a context embedder for associating images into an embedded vector space 250 based on context (e.g., a figure caption, textual reference, or semantic significance).

Embedded space 250 is a multi-dimensional vector space wherein each dimension corresponds to a style class for an image. Accordingly, a vector projection over each dimension indicates, for a given image, a degree to which the image includes or represents said style class. A style class may be defined by an image caption, or some other textual description of a semantic concept that is useful to distinguish one image from another, or classify two images as visually similar. The quantification of the number and type of style classifications, and the projection of image vectors on each of the style classifications for any given image, may be performed by training a non-linear algorithm such as a Deep Neural Network (DNN), an example of which may include GAN tools 242. The training of GAN tools 242 is enhanced every time a user activates deep vision tools 244, generative tools 246, or discriminative tools 248. Deep vision tools 244 map variable sized images in the image database into image vectors in embedded space 250, having a predetermined vector dimension. In some embodiments, deep vision tools 244 are trained to form an image vector in embedded space 250.

Generative tools 246 are configured to generate a plausible (e.g., 'realistic'), synthetic image given a compositional constraint (e.g., from a vector in embedded space 250) and a random seed. Discriminative tool 248 is configured to determine whether the synthetic image is real or not, and whether or not it matches the compositional constraint. In some embodiments, GAN tool 242 includes a recurrent tool that receives as input, from the user of client device 110, a sequence of image anchors as compositional constraints. In some embodiments, an image anchor is a box within a canvas having a location, a shape and a size, and a pre-selected content. The pre-selected content may include a specific image, a text query, or a full description of a desired theme within the box. More specifically, in some embodiments, at least one of GAN tools 242, deep vision tools 244, generative tools 246, or discriminative tools 248 include a neural network algorithm including multiple layers having nodes and coefficients associated to each node. The coefficients are determined based on a training set, wherein the gradients of the coefficients are weighted according to a desired outcome. Some embodiments include training discriminative tool 248 by applying the gradients to its coefficients based on losses (e.g., errors and failed assessments) resulting from real images with matching descriptions, from real images with invalid descriptions, and synthetic images (e.g., provided by generative tools 246). Accordingly, in some embodiments, discriminative tool 248 is configured to access image database 252 for training, and generative tools 246 is configured to provide synthetic images to image database 252.

The user may access GAN tools 242 through an application 222 or a web browser installed in a memory 220-1 of client device 110. Accordingly, application 222 may be installed by server 130 and perform scripts and other routines provided by server 130. Execution of application 222 may be controlled by a processor 212-1 in client device 110. In some embodiments, GAN tools 242, the tools contained therein, and at least part of image database 252 may be hosted in a different server that is accessible by server 130. Hereinafter, processors 212-1 and 212-2 will be collectively referred to as "processors 212." Likewise, memories 220-1 and 220-2 will be collectively referred to as "memories 220."

Figure 3:
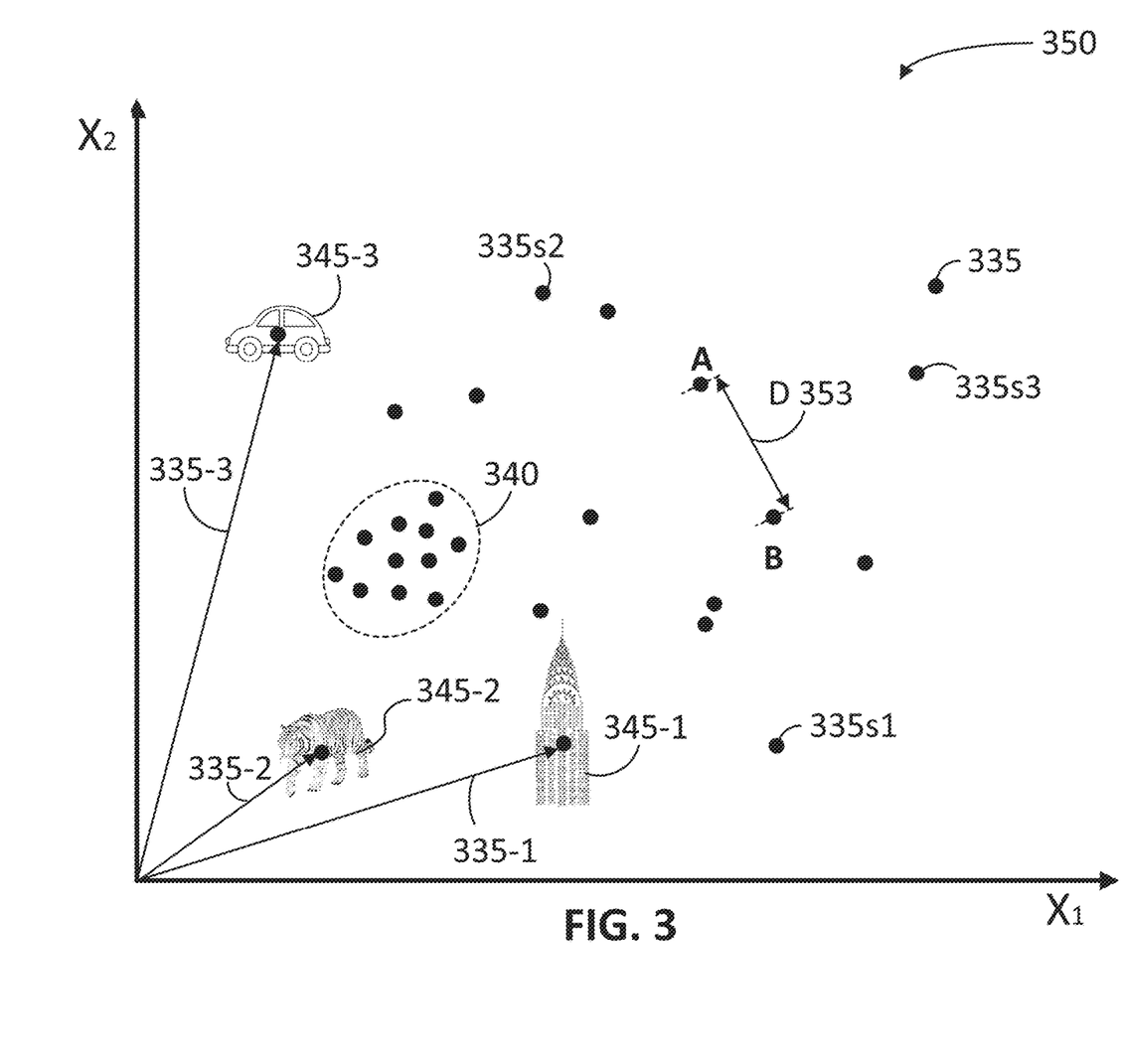
FIG. 3 illustrates an embedded space with image vectors to train an ensemble of discriminative tools to identify a synthetic image, according to some embodiments.

FIG. 3 illustrates an embedded space 350 (e.g., embedded space 250) with image vectors 335-1, 335-2, and 335-3 (hereinafter, collectively referred to as "image vectors 335") to train an ensemble of discriminative tools to identify a synthetic image, according to some embodiments. Image vectors 335 are associated, respectively, to images 345-1, 345-2, and 345-3 (hereinafter, collectively referred to as "images 345"). Without limitation, and for illustrative purposes only, image 345-1 may be a high-rise building, characteristic of a city landscape. Image 345-2 may be a prowling tiger. And image 345-3 may be an automobile. For illustrative purposes, only the projection of embedded space 350 on two dimensions, $X_1$, in the abscissae and $X_2$, in the ordinates, are illustrated. Image vectors 335 may be associated with images in image database 252.

Embedded space 350 may be formed by deep vision tool 244 using image database 252. Further, embedded space 350 may be stored in memory 220 (e.g., embedded space 250), or may be external to memory 220 and directly or remotely accessible to GAN tools 242 (e.g., image database 252). The values for $X_1$ and $X_2$, for each of image vectors 335, are selected according to deep vision tools 244. In some embodiments, deep vision tools 244 are configured so that vectors 335 associated with visually similar images are located, or "clustered" (e.g., in a cluster 340) in close proximity to each other in embedded space 350, wherein a distance, D 353, between any two image vectors 335 ('A,' and 'B') may be defined as a "cosine" distance, D. In some embodiments, and without limitation, a cosine distance between two vectors, A, and B, regardless of the dimensions of the vectors, may be obtained from the mathematical expression $$D = 1 - \frac{A \cdot B}{|A||B|}, \qquad (1)$$

where the "dot" product "·" may be suitably defined for the vector space that includes vectors A and B, and |A| and |B|, are generally "lengths" associated to vectors A and B, respectively, in the vector space. The lengths of vectors A and B may be defined in terms of coordinates $X_1(x)$ and $X_2(y)$ in different ways. For example, in some embodiments, the length of vectors A and B may be defined as:

$$|A| = \sqrt{x_A^2 + y_A^2} \qquad (2.1)$$

$$|B| = \sqrt{x_B^2 + y_B^2} \qquad (2.2)$$

And the dot product A·B may be defined as $$A \cdot B = x_A \cdot x_B + y_A \cdot y_B \qquad (2.3)$$

Therefore, it is expected that image vectors 335 within a cluster 340 are visually similar to one another. Moreover, the closer the cosine distance D 353, the more visual similarity between two image vectors 335 is expected.

In some embodiments, embedded space 350 includes synthetic image vectors 335s1, 335s2, and 335s3 (hereinafter, collectively referred to as "synthetic image vectors 335s," while also collectively included in the term "image vectors 335"). Synthetic image vectors 335s may be associated with images that have been previously identified as purely synthetic (100% synthetic), or that have been created by any one of generative tools 246 within test ensemble engine 240, or any other known graphic editing tool. Accordingly, the proximity (measured as distance D 353, cf. Eq. 1) of an image vector 335 to any one of synthetic image vectors 335s may indicate a degree or a probability that the image vector corresponds to a synthetic image. In some embodiments, each of GAN tools 242 in test ensemble engine 240 may be trained over one or more of synthetic image vectors 335s. Accordingly, in some embodiments, test ensemble engine 240 may apply a weighted average of the results for the distances D 353 between a given image vector 335 to each of synthetic image vectors 335s, to assess a synthetic value for the image vector. For example, in some embodiments test ensemble 240 may use a Deep Learning network to determine the best weights for different distances D 353 through extensive training and testing on numerous images.

Figure 4:
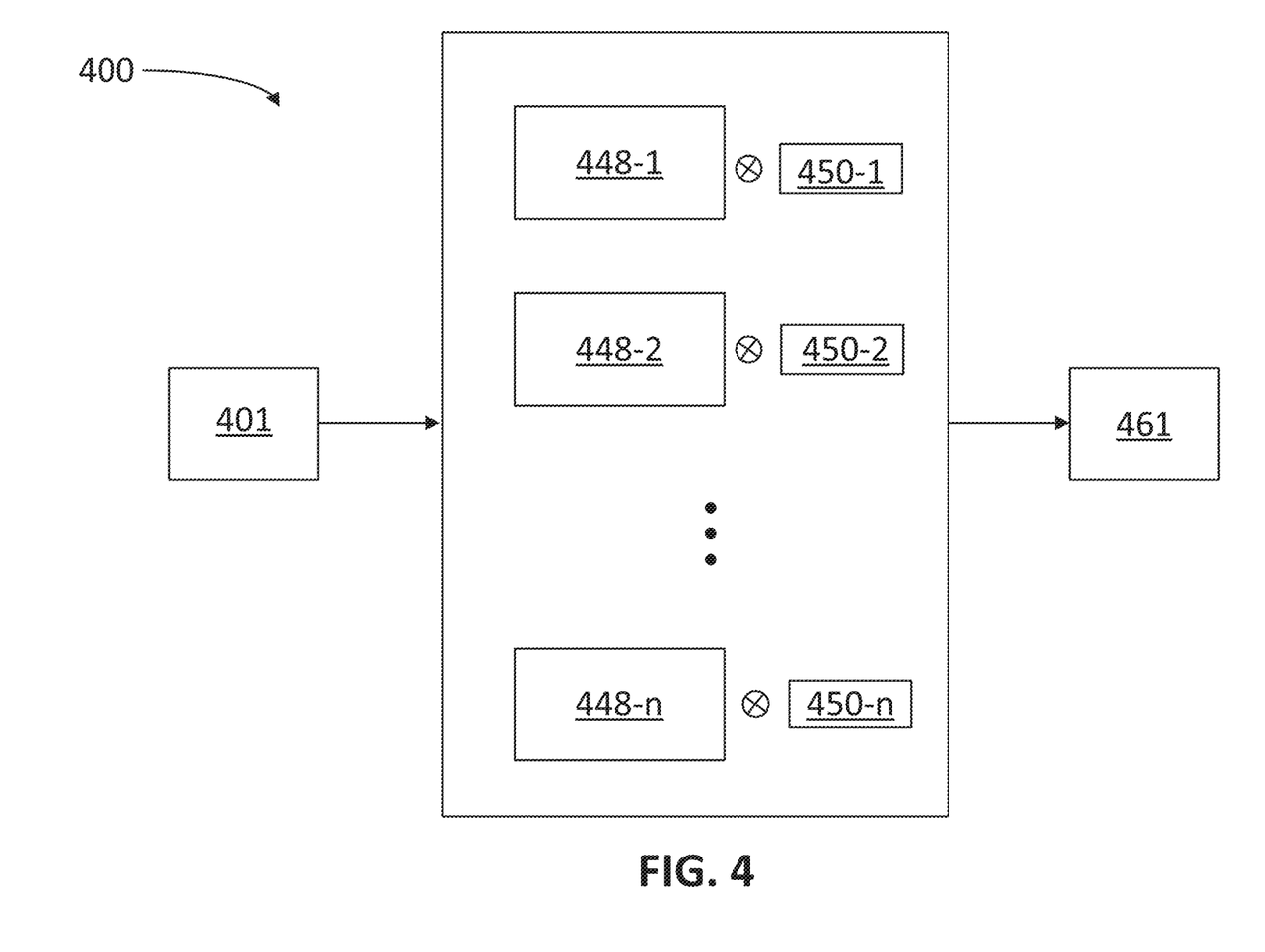
FIG. 4 illustrates a test ensemble including multiple discriminative tools to identify a synthetic image, according to some embodiments.

FIG. 4 illustrates a test ensemble 400 including multiple discriminative tools 448-1, 448-2 through 448-n (hereinafter, collectively referred to as "discriminative tools 448") to identify a synthetic image, according to some embodiments. In some embodiments, test ensemble 400 associates weighting factors 450-1, 450-2 through 450-n (collectively referred to, hereinafter, as "weighting factors 450"), respectively, to each of discriminative tools 448.

An image 401 is provided to test ensemble 400 to assess a synthetic score 461. The synthetic score may be a percent value, or a number between 0 and 1, indicative of the degree that image 401 is synthetic. For example, a score of 0, or 0%, indicates a certainty that image 401 is not synthetic. In contrast, a score of 1, or 100%, indicates a certainty that image 401 is synthetic.

In some embodiments, the values of weighting factors 450 may be determined by executing test ensemble 400 over a training set of images 401, wherein the images have a known synthetic value (e.g., images in image database 252 corresponding to synthetic images vectors 335s). In some embodiments, weighting factors 450 may be determined automatically with a back-propagation technique with a learning algorithm such as stochastic gradient descent (SGD).

Figure 5:
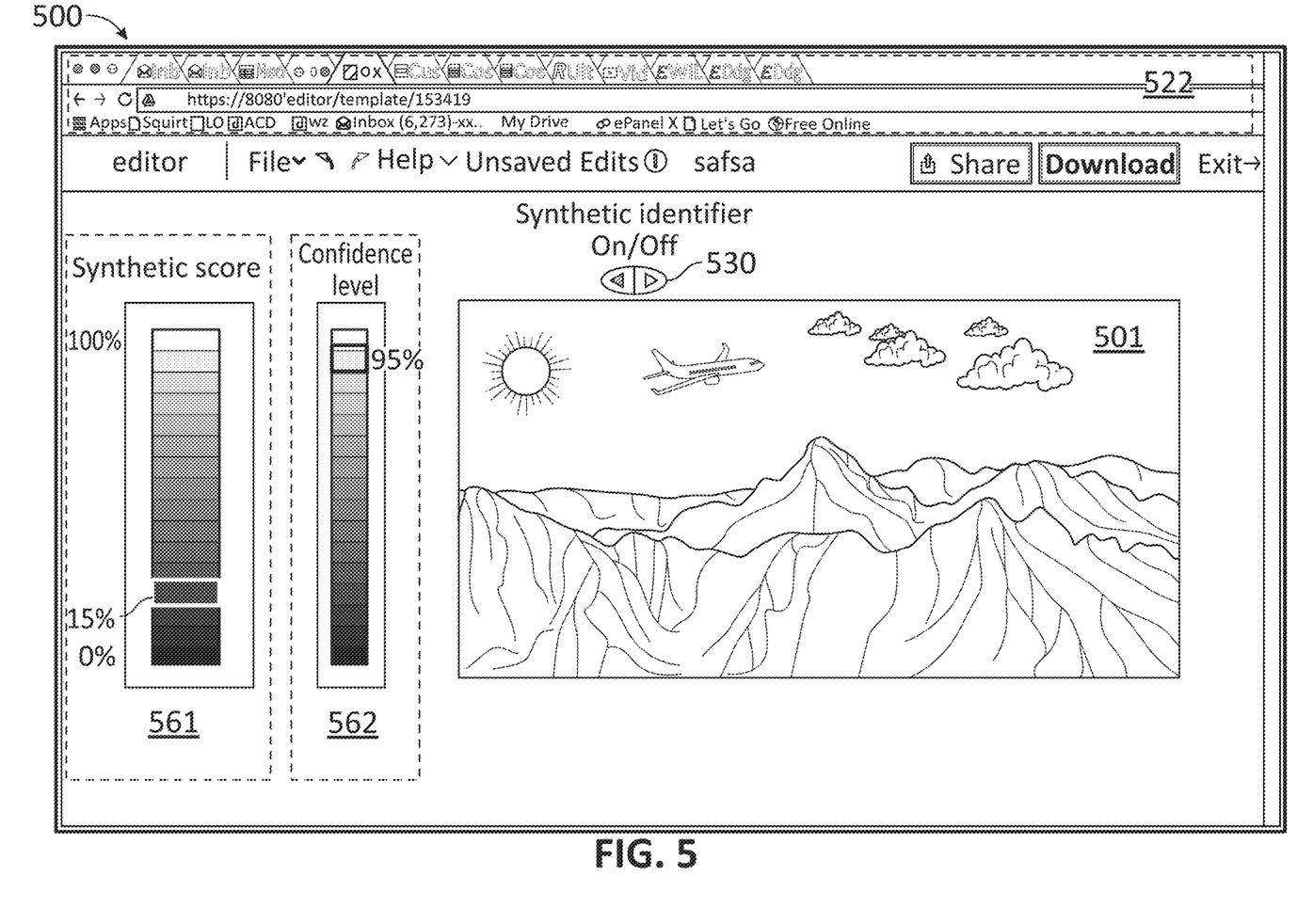
FIG. 5 illustrates a screenshot of a web portal for a server configured to detect synthetic images, according to some embodiments.

FIG. 5 illustrates a screenshot of a web portal 500 for a server configured to detect synthetic images using a test ensemble engine (e.g., server 130 and test ensemble engine 240), according to some embodiments. Web portal 500 may provide access to a graphic editing tool 522 that includes the test ensemble engine to detect synthetic images. In some embodiments, graphic editing tool 522 may be installed in a client device for a user registered with the server, and is remotely hosted by a server (e.g., client device 110, application 222). The user accesses web portal 500 and loads or selects an image 501, for editing, purchase, download, or analysis. Accordingly, the user may select a button 530 to activate a synthetic identifier included in the test ensemble engine. A synthetic score 561 is then provided, indicating the probability that image 501 is a synthetic image.

In some embodiments, web portal 500 may also include a confidence level 562 for the synthetic value. In that regard, each discriminator in the test ensemble engine may return synthetic score 561 as a Boolean value ('1' for "fake," or '0' for "real"), and assign a percent confidence for the value. For instance, a first discriminator, D1, (one of the discriminators in the ensemble) may determine that image 501 is real with 81% confidence. A second discriminator, D2, may determine that image 501 is real with 46% confidence (e.g., 64% confidence that image 501 is fake). A third discriminator, D3, may determine that image 501 is real with 65% confidence. Then, confidence level 562 may be determined as a direct average of the confidence values for each discriminator, e.g., (81%+46%+65%)/3=64%, in the above example. In some embodiments, confidence level 562 may be a weighted average of the confidence levels from each of the discriminators in the test ensemble engine. In some embodiments confidence level 562 may be determined by the training process of the NN for the test ensemble engine. In some embodiments, a discriminator in the test ensemble engine may assign a fake value (e.g., synthetic value equal to '1') to a picture when it detects tampering with even a single pixel. However, for such determination, the discriminator may assign a confidence level based on the degree of tampering to the single pixel, or the total number of pixels in image 501.

In some embodiments, graphic editing tool 522 allows users to generate images 501 "on the fly" that adhere to a specified synthetic score 561. For example, in some embodiments, the user may combine different elements or images in a graphic composition, and request that the resulting graphic composition have a synthetic score of '0' with a confidence level greater than 85%, 90%, 95%, or 99%.

Figure 6:
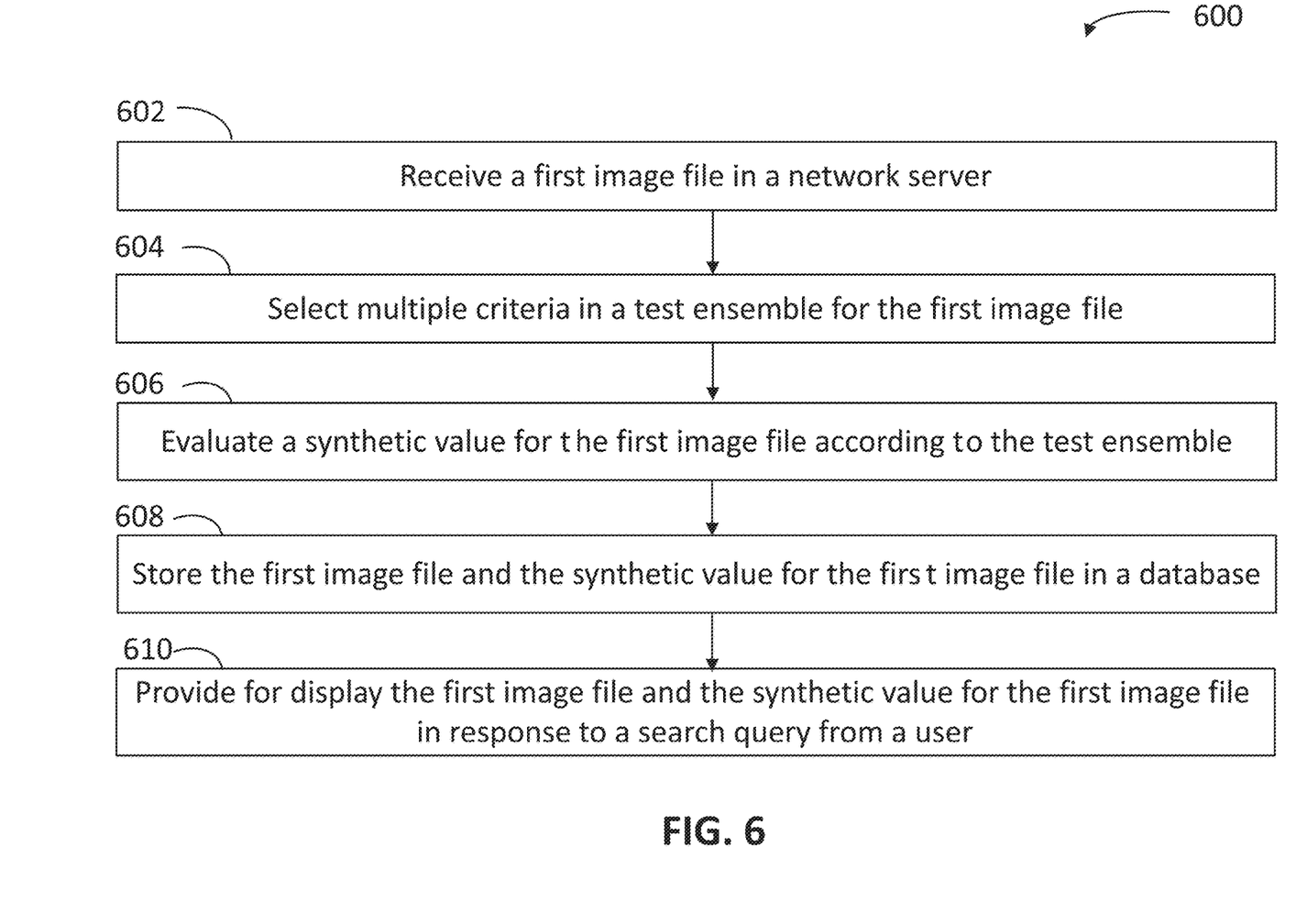
FIG. 6 is a flow chart illustrating steps in a method for detecting a synthetic image, according to some embodiments.

FIG. 6 is a flow chart illustrating steps in a method 600 for detecting a synthetic image, according to some embodiments. Method 600 may be performed at least partially by any one of multiple network servers hosting a collection of images, videos, and multimedia files (e.g., images and video clips), while communicating with any one of a plurality of client devices through a network (e.g., any one of servers 130 and any one of client devices 110 in network 150). The client devices may be handled by a user, wherein the user may be registered to a private account with the server, or may be a visitor to the server website or logged in a server application (e.g., application 222). At least some of the steps in method 600 may be performed by a computer having a processor executing commands stored in a memory of the computer (e.g., processors 212 and memories 220). Further, steps as disclosed in method 600 may include retrieving, editing, and/or storing files in an image database that is part of, or is communicably coupled to, the computer, using, inter-alia, a test ensemble engine hosting one or more GAN tools (e.g., database 252, test ensemble engine 240, and GAN tools 242). The GAN tools may include a deep vision tool to embed images into an embedded space, a generative tool to form synthetic images from merged vectors, and a discriminative tool to determine how realistic a synthetic image is (e.g., deep vision tools 244, generative tools 246, discriminative tools 248, and embedded spaces 250 and 350). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving a first image file in the network server. In some embodiments, step 602 may include determining a salient feature in the first image file, and selecting at least one criterion in the test ensemble based on the salient feature. In some embodiments, step 602 may include determining a background feature in the first image file, and selecting one criterion in the test ensemble based on the background feature. In some embodiments, step 602 includes selecting the first image file from a training database, further comprising modifying the test ensemble based on the synthetic value and a known synthetic value of the first image file.

Step 604 includes selecting multiple criteria in the test ensemble for the first image file. In some embodiments, step 604 includes selecting, for the test ensemble, a discriminative tool in a generative adversarial network based on at least one criterion. In some embodiments, step 604 includes receiving a second image file and selecting a second test ensemble based on at least one different criterion for the second image file.

Step 606 includes evaluating a synthetic value for the first image file according to the test ensemble. In some embodiments, step 606 includes applying multiple discriminative tools to the first image file, each discriminative tool associated with at least one criterion and trained against a generative tool over a training set of image files. In some embodiments, step 606 includes evaluating a confidence level for the synthetic value based on a second image file in the database that is similar to the first image file, and modifying at least one criterion based on the confidence level, wherein the second image file has a known synthetic value.

Step 608 includes storing the first image file and the synthetic value for the first image file in the database.

Step 610 includes providing for display the first image file and the synthetic value for the first image file in response to a search query from a user. In some embodiments, step 610 may further include storing the first image file and the synthetic value in a training database. In some embodiments, receiving the first image file and providing for display the first image file and the synthetic value comprises hosting an application programming interface installed in a client device.

Figure 7:
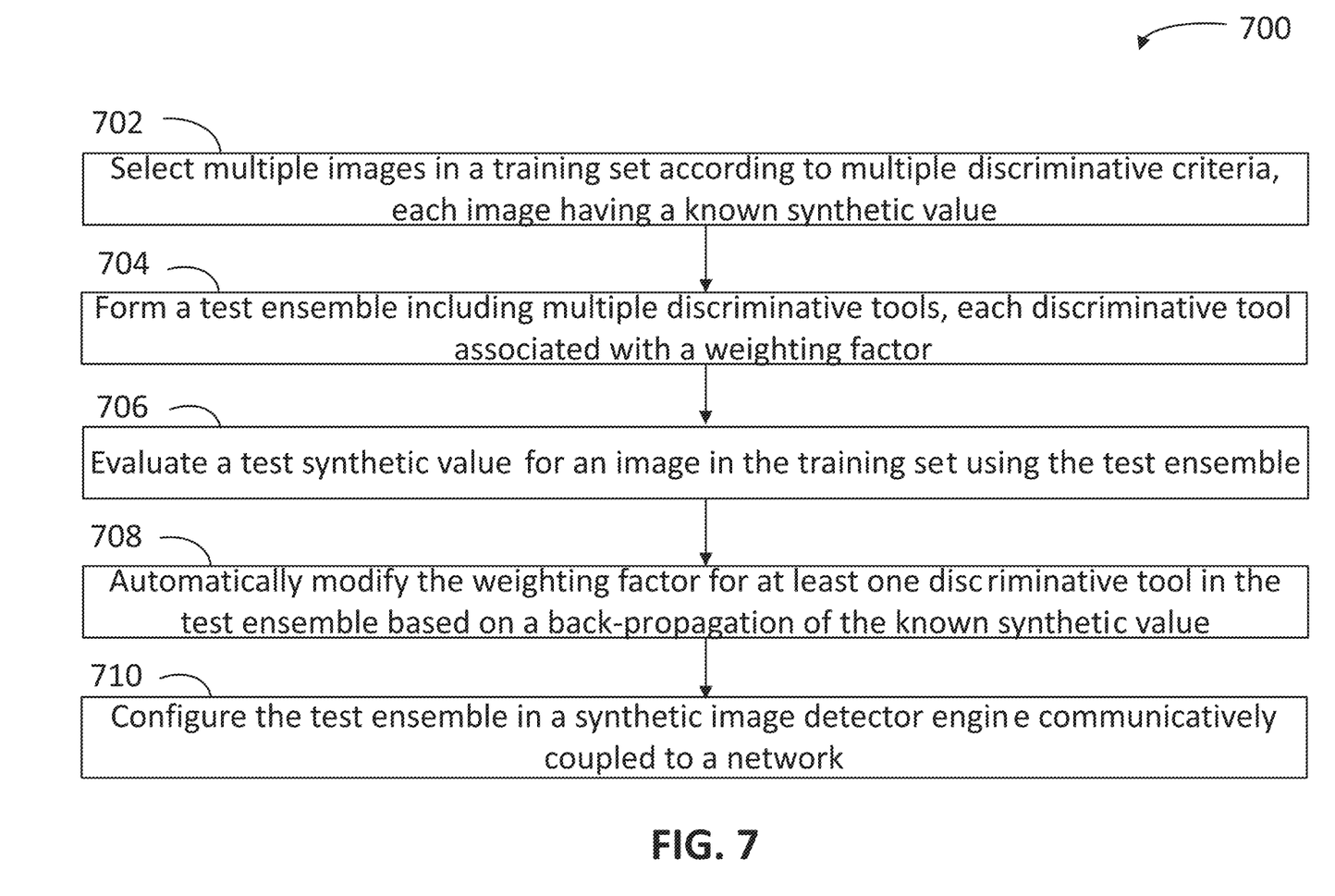
FIG. 7 is a flow chart illustrating steps in a method for training an ensemble of discriminative tools to detect synthetic images, according to some embodiments.

FIG. 7 is a flow chart illustrating steps in a method 700 for training an ensemble of discriminative tools to detect synthetic images, according to some embodiments. Method 700 may be performed at least partially by any one of multiple network servers hosting a collection of images, videos, and multimedia files (e.g., images and video clips), while communicating with any one of a plurality of client devices through a network (e.g., any one of servers 130 and any one of client devices 110 in network 150). The client devices may be handled by a user, wherein the user may be registered to a private account with the server, or may be a visitor to the server website or logged in a server application (e.g., application 222). At least some of the steps in method 700 may be performed by a computer having a processor executing commands stored in a memory of the computer (e.g., processors 212 and memories 220). Further, steps as disclosed in method 700 may include retrieving, editing, and/or storing files in an image database that is part of, or is communicably coupled to, the computer, using, inter-alia, a test ensemble engine hosting one or more GAN tools (e.g., database 252, test ensemble engine 240, and GAN tools 242). The GAN tools may include a deep vision tool to embed images into an embedded space, a generative tool to form synthetic images from merged vectors, and a discriminative tool to determine how realistic a synthetic image is (e.g., deep vision tools 244, generative tools 246, discriminative tools 248, and embedded spaces 250 and 350). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes selecting multiple images in a training set according to multiple discriminative criteria, each image having a known synthetic value. In some embodiments, step 702 includes generating a synthetic image for the training set with a generative tool associated with at least one discriminative tool in the test ensemble, and associating a binary value to the known synthetic value of the synthetic image.

Step 704 includes forming a test ensemble including multiple discriminative tools, each discriminative tool associated with a weighting factor. In some embodiments, each of the discriminative tools includes multiple coefficients selected over a generative tool. The generative tool may be configured to create a synthetic image and the discriminative tool be configured to identify the synthetic image as not real. In some embodiments, step 704 includes selecting each of the discriminative tools based on at least one discriminative criterion.

Step 706 includes evaluating a test synthetic value for an image in the training set using the test ensemble.

Step 708 includes automatically modifying the weighting factor for at least one discriminative tool in the test ensemble based on a back-propagation of the known synthetic value. In some embodiments, step 708 is performed automatically using a back-propagation technique with a learning algorithm such as stochastic gradient descent (SGD). In some embodiments, step 708 includes modifying the weighting factor for at least one discriminative tool in the test ensemble based on a difference between the known synthetic value and the test synthetic value.

Step 710 includes configuring the test ensemble in a synthetic image detector engine communicatively coupled to the network. In some embodiments, step 710 includes generating, with a generative tool associated with at least one discriminative tool, a synthetic image based on an image from the training set. In some embodiments, step 710 includes assigning a binary synthetic value to the synthetic image, determining a synthetic value for the synthetic image with the at least one discriminative tool, and selecting the weighting factor for the at least one discriminative tool based on a difference between the synthetic value and the binary synthetic value. In some embodiments, step 710 includes hosting an application programming interface in a client device, through the network.

Hardware Overview

Figure 8:
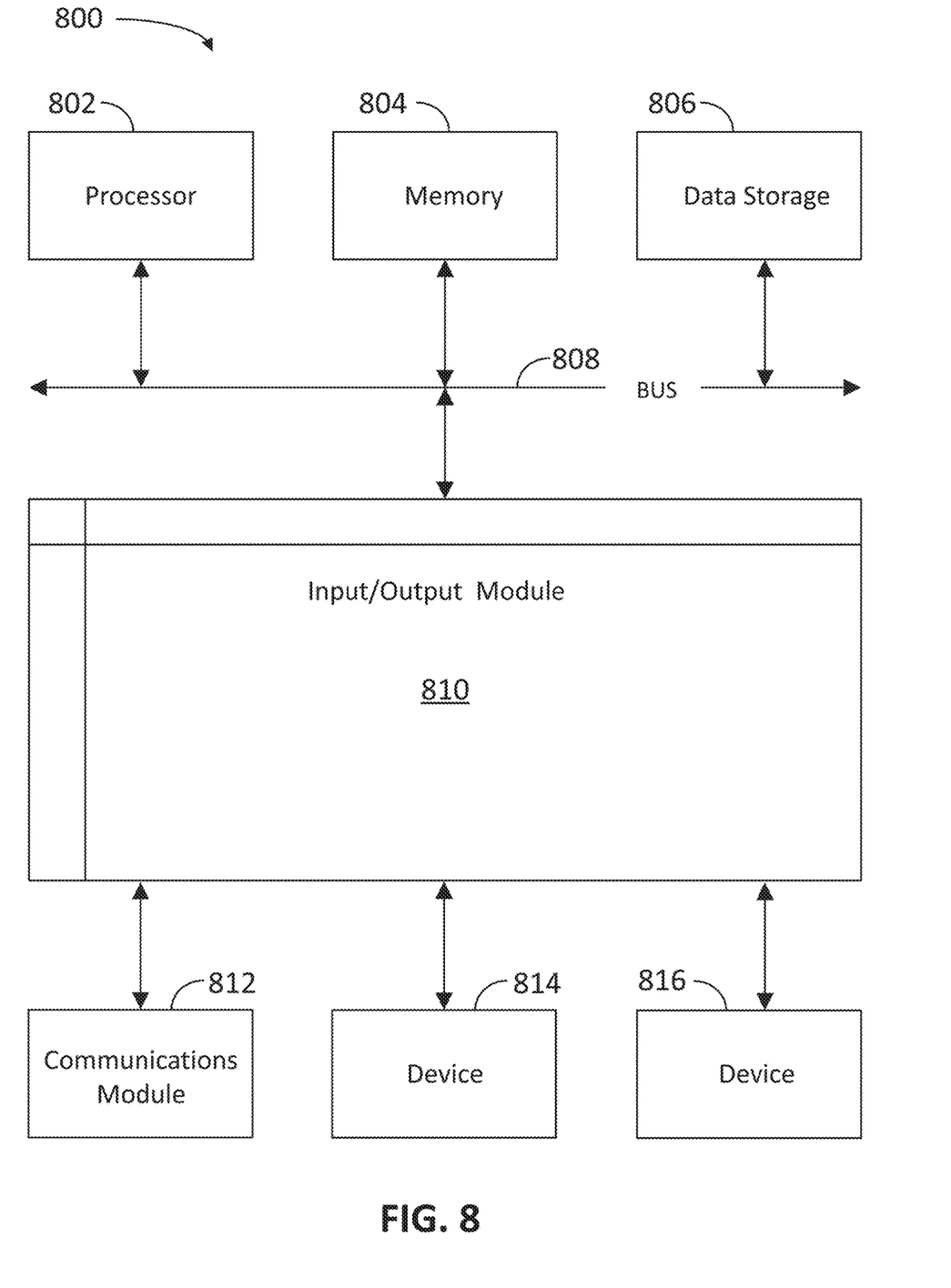
FIG. 8 is a block diagram illustrating an example computer system with which the client and server of FIGS. 1 and 2 and the methods of FIGS. 6-7 can be implemented.

FIG. 8 is a block diagram illustrating an exemplary computer system 800 with which the client 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well known to those of skill in the art, including, but not limited to, computer languages such as data-oriented languages (e.g., SQL, dBase, Hive), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving a first image file in a network server;
selecting multiple criteria in a test ensemble for the first image file;
evaluating a synthetic value for the first image file according to the test ensemble;
storing the first image file and the synthetic value for the first image file in a database; and
providing for display the first image file and the synthetic value for the first image file in response to a search query from a user, wherein:
the test ensemble comprises multiple discriminative tools configured to provide multiple separate synthetic values for the first image file, each discriminative tool being associated with at least one criterion and trained against a generative tool over a training set of image files, and
the synthetic value is a weighted sum of the separate synthetic values and the synthetic value is indicative of a probability that the first image file is synthetic according to one of the criteria.

2. The computer-implemented method of claim 1, wherein evaluating a synthetic value for the first image file comprises evaluating a confidence level associated with the synthetic value.

3. The computer-implemented method of claim 1, further comprising:
determining a salient feature in the first image file; and
selecting at least one criterion in the test ensemble based on the salient feature.

4. The computer-implemented method of claim 1, further comprising:
determining a background feature in the first image file; and
selecting one criterion in the test ensemble based on the background feature.

5. The computer-implemented method of claim 1, further comprising associating a weighting value to each of the criteria based on a back-propagation technique applied over a training set with multiple images from the database.

6. The computer-implemented method of claim 1, further comprising selecting, for the test ensemble, a discriminative tool in a generative adversarial network based on at least one criterion.

7. The computer-implemented method of claim 1, further comprising:
receiving a second image file; and
selecting a second test ensemble based on at least one different criterion for the second image file.

8. The computer-implemented method of claim 1, wherein receiving a first image file in a network server comprises:
selecting the first image file from a training database; and
modifying the test ensemble based on the synthetic value and a known synthetic value of the first image file.

9. The computer-implemented method of claim 1, further comprising storing the first image file and the synthetic value in a training database.

10. The computer-implemented method of claim 1, wherein receiving the first image file and providing for display the first image file and the synthetic value comprises hosting an application programming interface installed in a client device.

11. A system comprising:
one or more processors; and
a memory coupled to the one or more processors, the memory including instructions that, when executed by the one or more processors, cause the one or more processors to:
receive a first image file;
select multiple criteria in a test ensemble for the first image file;
evaluate a synthetic value for the first image file according to the test ensemble;
store the first image file and the synthetic value for the first image file in a database; and
provide for display the first image file and the synthetic value for the first image file in response to a search query from a user, wherein
the test ensemble comprises multiple discriminative tools configured to provide multiple separate synthetic values for the first image file, each discriminative tool being associated with at least one criterion and trained against a generative tool over a training set of image files, and
the synthetic value is a weighted sum of the separate synthetic values, and the synthetic value is indicative of a probability that the first image file is synthetic according to one of the criteria.

12. The system of claim 11, wherein to evaluate a synthetic value for the first image file the one or more processors further execute the instructions to evaluate a confidence level associated with the synthetic value.

13. The system of claim 11, wherein the one or more processors further execute the instructions to:
determine a salient feature in the first image file; and
select at least one criterion in the test ensemble based on the salient feature.

14. The system of claim 11, wherein the one or more processors further execute the instructions to:
determine a background feature in the first image file; and
select one criterion in the test ensemble based on the background feature.

* * * * *